(12) United States Patent
Tate et al.

(10) Patent No.: US 8,156,656 B2
(45) Date of Patent: Apr. 17, 2012

(54) HEDGETRIMMER WITH ROTATABLE REAR HANDLE

(75) Inventors: Clare Tate, Co. Durham (GB); Matt Tollini, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 371 days.

(21) Appl. No.: 12/437,165

(22) Filed: May 7, 2009

(65) Prior Publication Data

US 2010/0281697 A1 Nov. 11, 2010

(51) Int. Cl.
*B26B 19/02* (2006.01)
(52) U.S. Cl. .............. 30/392; 30/210; 30/216; 30/382; 16/110.1
(58) Field of Classification Search .......... 30/210, 30/216, 381, 382, 383, 392, 519; 16/110.1, 16/436, 900; 451/516
See application file for complete search history.

(56) References Cited

U.S. PATENT DOCUMENTS

| | | | |
|---|---|---|---|
| 3,044,171 A | 7/1962 | Cecere | |
| 3,637,029 A | 1/1972 | Sherwood, Jr. et al. | |
| 4,381,037 A | 4/1983 | Cuneo | |
| 4,785,540 A | 11/1988 | Arvidsson | |
| 4,974,325 A | 12/1990 | Hartlein | |
| 5,065,476 A * | 11/1991 | Dohse et al. | 16/426 |
| 5,201,146 A | 4/1993 | Fushiya | |
| 5,269,045 A | 12/1993 | DeSerio et al. | |
| 5,339,572 A | 8/1994 | Eicher | |
| 5,407,381 A | 4/1995 | Schaefer et al. | |
| 5,466,183 A | 11/1995 | Kirn et al. | |
| 5,778,649 A | 7/1998 | Losdahl et al. | |
| 6,021,757 A | 2/2000 | Nagashima | |
| 6,102,134 A * | 8/2000 | Alsruhe | 173/217 |
| 6,108,867 A | 8/2000 | Nagashima | |
| 6,293,859 B1 | 9/2001 | Fink et al. | |
| 6,602,122 B1 | 8/2003 | Rudolf et al. | |
| 6,764,256 B2 | 7/2004 | Miura | |
| 6,912,790 B2 | 7/2005 | James et al. | |
| 6,973,726 B2 | 12/2005 | Kramer | |
| 7,159,322 B2 | 1/2007 | Sasaki et al. | |
| 7,204,026 B2 | 4/2007 | Phillips et al. | |
| 7,217,178 B2 | 5/2007 | Oki et al. | |
| 7,591,604 B2 * | 9/2009 | Roberts | 403/101 |
| 7,866,048 B2 * | 1/2011 | Kodama et al. | 30/216 |
| 2003/0095842 A1 * | 5/2003 | Bone | 408/234 |
| 2004/0148789 A1 | 8/2004 | Gist et al. | |
| 2005/0188552 A1 | 9/2005 | Gist et al. | |
| 2005/0204568 A1 | 9/2005 | Sasaki | |
| 2010/0101096 A1 * | 4/2010 | Yamaoka et al. | 30/199 |
| 2010/0199949 A1 * | 8/2010 | Tamura et al. | 123/334 |

FOREIGN PATENT DOCUMENTS

| | | |
|---|---|---|
| DE | 2816485 | 10/1979 |
| DE | 3114906 | 10/1982 |
| EP | 1579757 | 9/2005 |
| EP | 2 248 413 | * 11/2010 |
| WO | 2006134749 | 12/2006 |

* cited by examiner

*Primary Examiner* — Hwei C Payer
(74) *Attorney, Agent, or Firm* — John Yun

(57) ABSTRACT

A hedgetrimmer having a housing, a motor located within the housing for driving a reciprocating blade for cutting vegetation. A front handle located at a front end of the housing and a rear handle located at a rear end of the housing. The rear handle having a trigger to actuate the motor, the rear handle being rotatable around a longitudinal axis of the housing. The rear handle is lockable at one of several positions so that a user can grip the two handles in the most comfortable position for the desired cutting operation.

13 Claims, 6 Drawing Sheets

HEDGETRIMMER WITH ROTATABLE REAR HANDLE

FIELD OF THE INVENTION

The present disclosure relates to hedgetrimmers, and in particular hedgetrimmers having a rotatable rear handle to provide a user with easy and comfortable gripping positions while using the device in a variety of positions and orientations.

BACKGROUND OF THE INVENTION

Hedgetrimmers are used to cut a variety of bushes, hedges and other outdoor vegetation. The cutting operation requires the user to move the hedgetrimmer around a typical bush at various angles. Current hedgetrimmers have fixed handle positions so that the user must bend or twist his arms and/or body to orient the hedgtrimmer properly for the desired cut. For instance, a user cutting the top of a bush would orient his hands and/or body in one particular way, and orient them in another way if cutting the front or bottom of the bush. These different positions can be uncomfortable and even dangerous if the user's grip is weakened by the shifting gripping position. Therefore, it would be desirable to have a hedgetrimmer whose handle can move to accommodate the various orientations as the user cuts around a bush.

BRIEF SUMMARY OF THE INVENTION

A hedgetrimmer having a housing, a motor located within the housing for driving a reciprocating blade for cutting vegetation. A front handle located at a front portion of the housing and a rear handle located at a rear portion of the housing. The rear handle having a trigger to actuate the motor, and being rotatable around a longitudinal axis of the housing. The rear handle is lockable at one of several positions so that a user can grip the two handles in the most comfortable position for the desired cutting operation.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
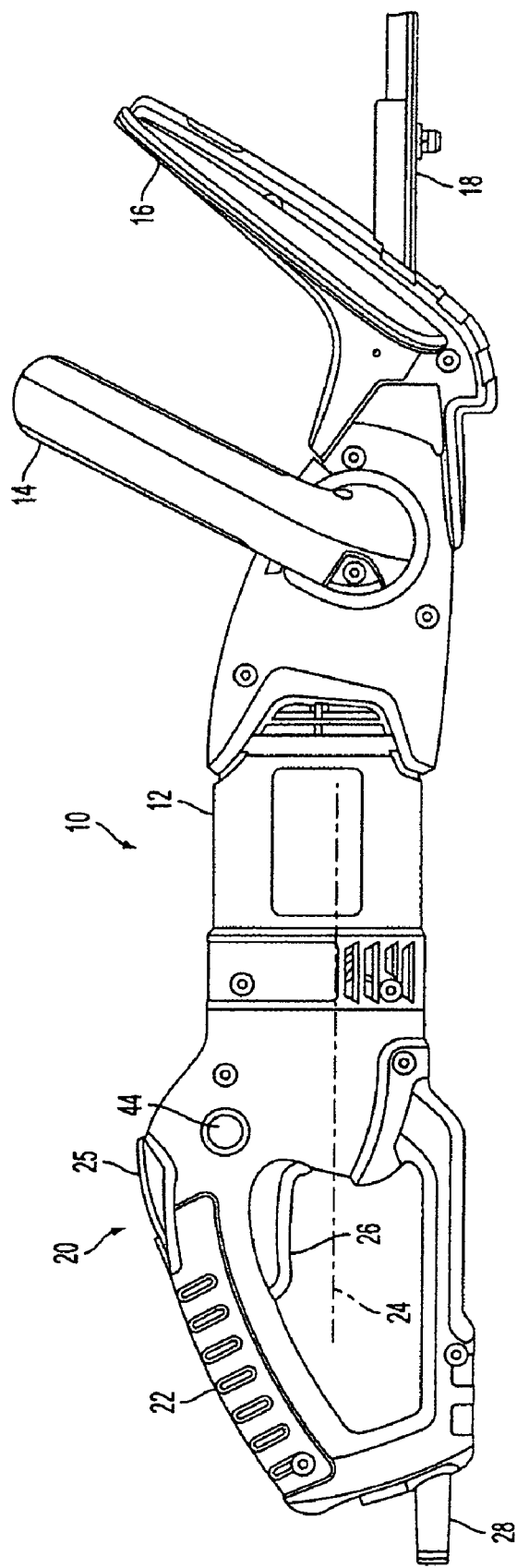
FIG. 1 is a side view of an exemplary hedgetrimmer with the rear handle in a first position in accordance with the present disclosure.

Referring to FIG. 1, an exemplary hedgetrimmer constructed in accordance with the present teachings is shown as reference numeral 10. The hedgetrimmer 10 has a housing 12 with a motor 30 therein (shown in FIG. 3). The motor 30 is connected to and drives the reciprocating cutting blade 18. A front handle 14 is connected to a front portion of the housing.

The blade 18 extends from a front end of the housing, and a blade guard 16 is connected to the housing just forward of the front handle to shield a user's hand. The front handle 14 can be fixed or allowed to pivot forward and backward.

FIG. 1 shows a rear handle 20 rotatably connected to a rear portion of the housing 12 in a first position. The rear handle 20 has a gripping member 22 aligned in the same direction as the longitudinal axis 24 of the housing. A trigger 26 for actuating the motor is located underneath the gripping member so that a user can actuate the motor while maintaining his grip. A trigger lock 25 (FIGS. 1 and 3) is located on the gripping member 22 to lock the trigger in either the "on" or "off" position. In the "on" position, the trigger lock 25 spares the user from having to constantly depress the trigger, thus avoiding user fatigue. An example of a trigger lock is disclosed in U.S. Pat. No. 6,610,946 and incorporated herein by reference. A power cord 28 is connected to the rear handle 20 and supplies electrical power to the motor via a switch 27 (see FIG. 3). Although the hedgetrimmer is shown with an electrical cord, it should be appreciated that any power source, such as gas or battery, could be utilized and fall within the scope of the invention.

Figure 2:
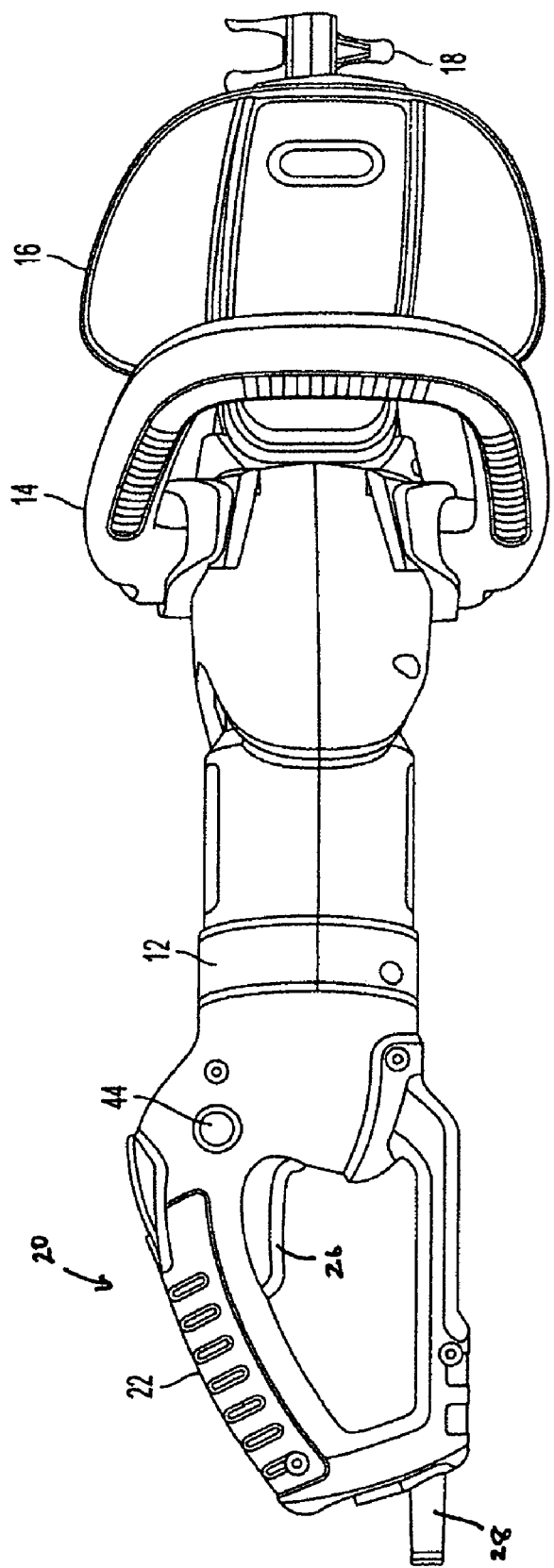
FIG. 2 is a top view of the hedgetrimmer of FIG. 1 with the rear handle rotated into a second position.

FIG. 2 shows the hedgetrimmer of FIG. 1, in a top view, with the rear handle 20 in a second position. The rear handle 20 has been rotated 90° to the left so that it is no longer aligned with the front handle 14. With the rear handle 20 rotated in this manner, the blade 18 is oriented vertically so a front surface of a bush or other vegetation can be cut. Compare this with FIG. 1 where the blade is oriented horizontally, making it easier to cut the top surface or a bush or other vegetation.

Figure 3:
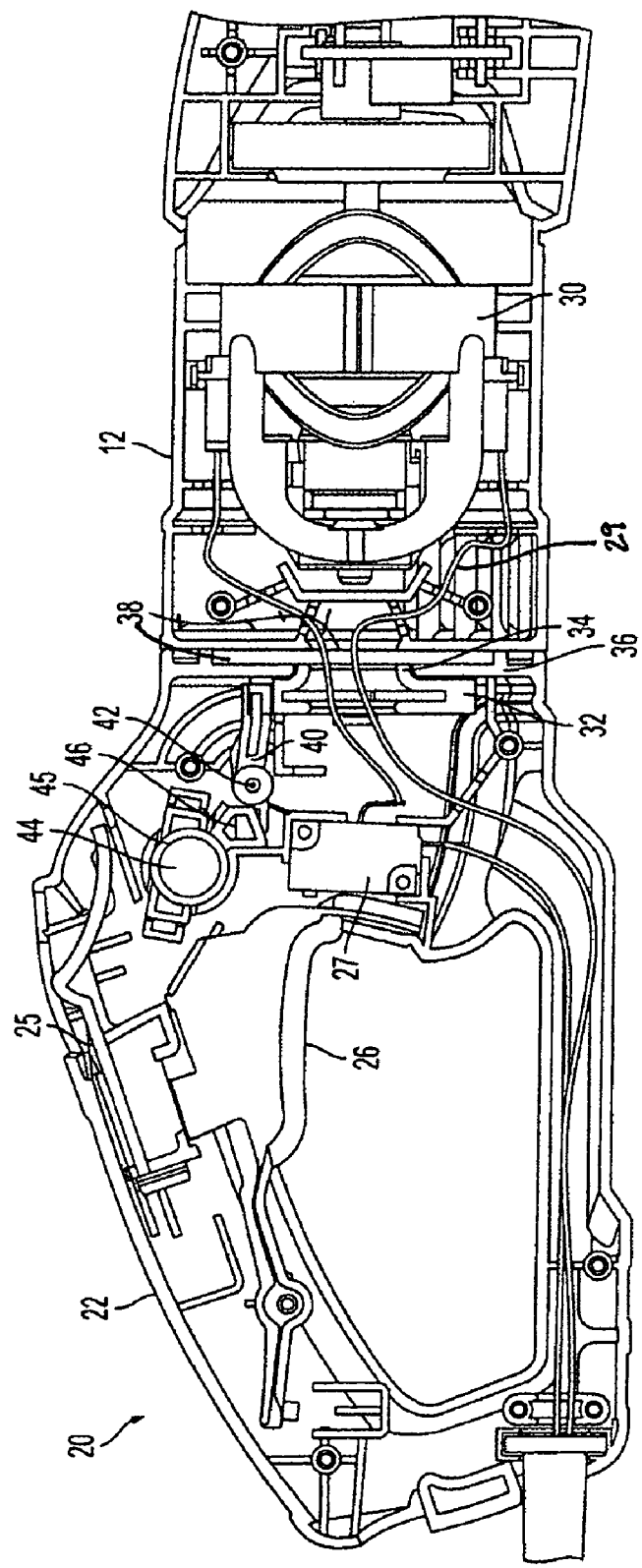
FIG. 3 is a side sectional view of the rear handle and motor housing.

FIG. 3 is a cut-away side view of the housing 12 and the rear handle 20. The housing 12 forms a cavity for holding the motor 30, with a rearward end forming a circular hub 32. The hub 32 is formed with a central opening through which wiring 29 is pulled through to connect the switch 27 and electrical power cord 28 to the motor 30. The hub 32 is spaced from the housing 12 to form a groove 34.

The rear handle 20 is formed by two clamshell halves, a forward end of which form a ring 36 that is secured to the housing via the groove 34. A friction plate 38 is located within the groove 34 to provide resistance between the rear handle and the hub, ensuring a moderate amount of force is required to turn the rear handle 20 and provides greater control for the user.

Figure 4:
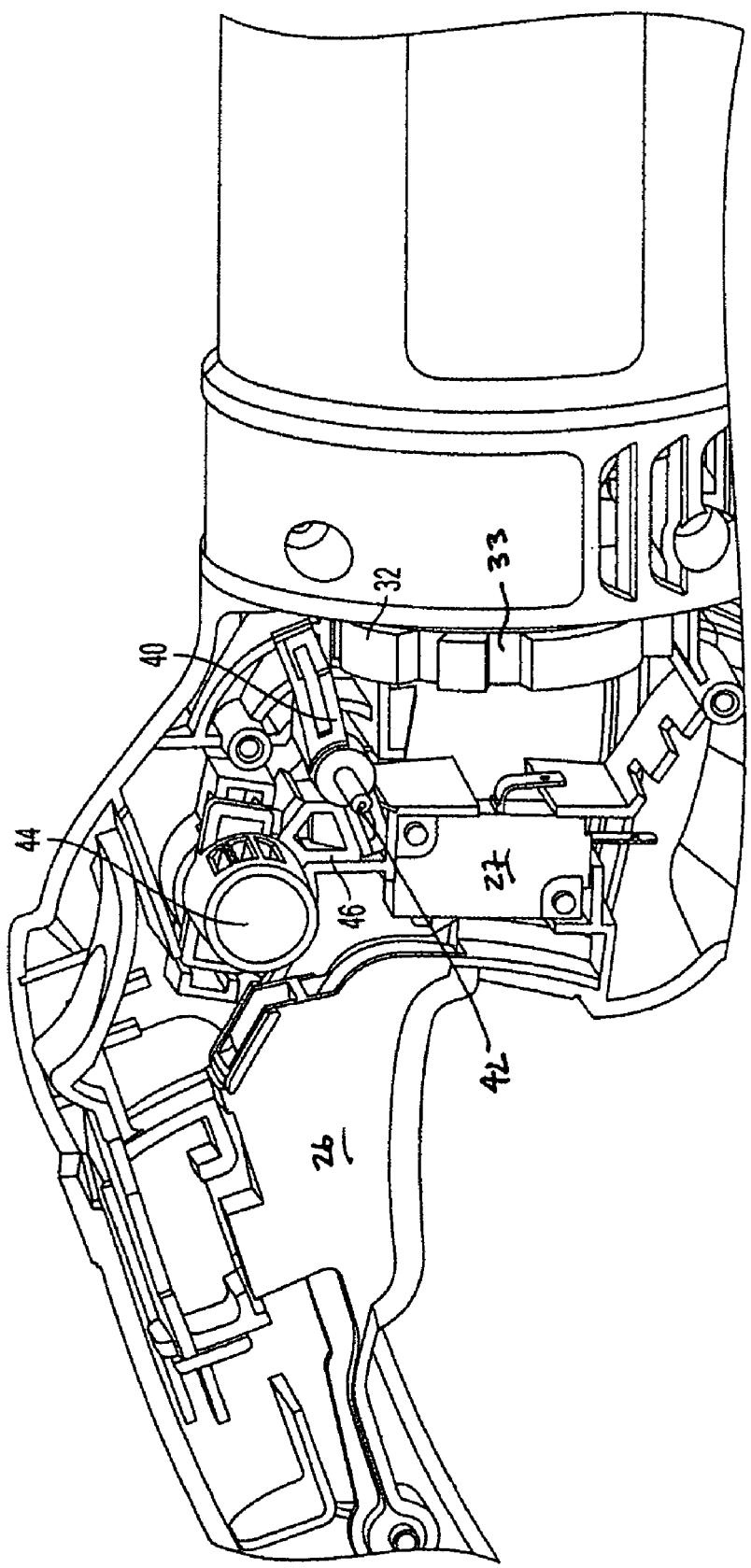
FIG. 4 is a side perspective view showing the interior of the rear handle.
Figure 5:
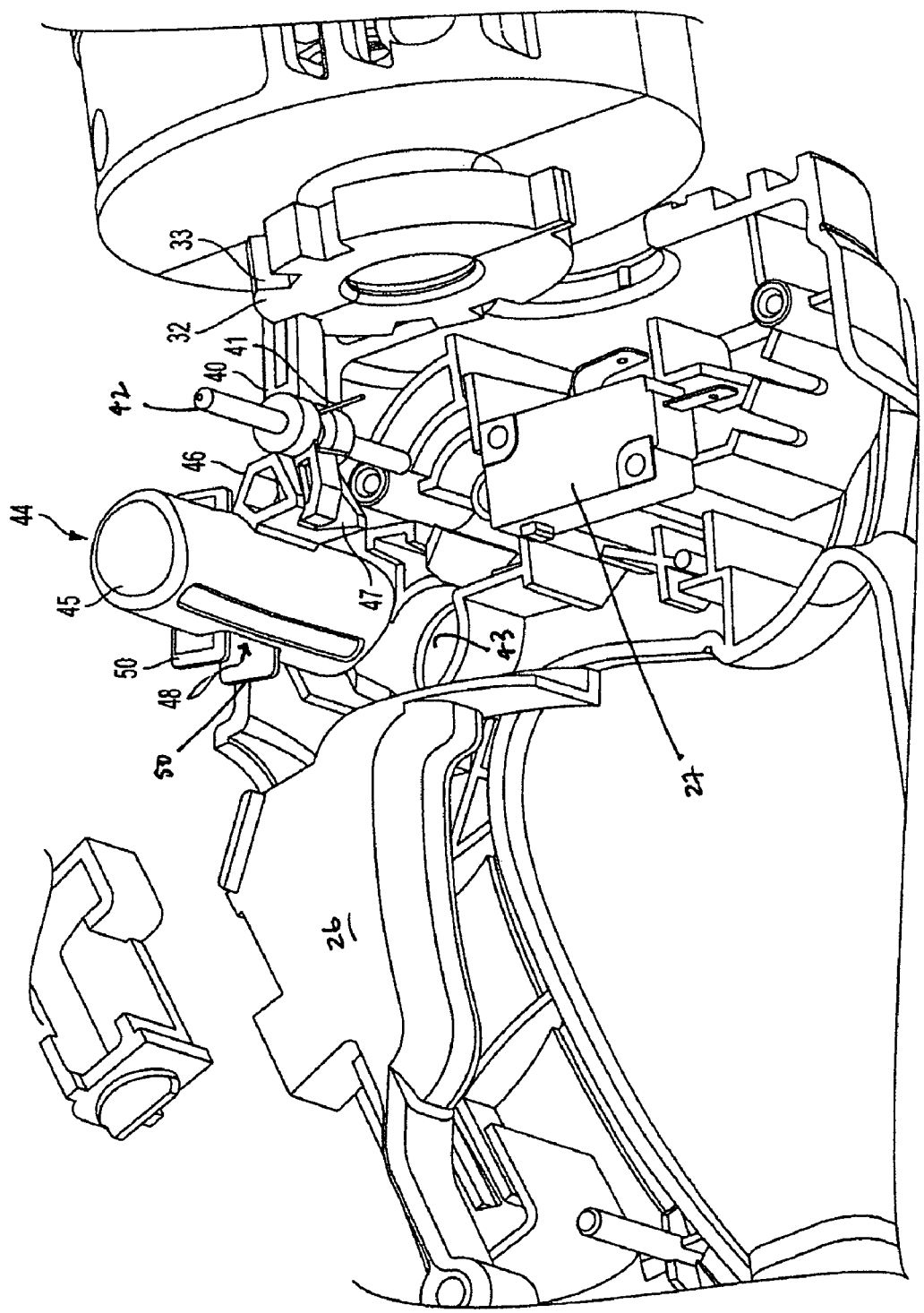
FIG. 5 is an exploded view of the rear handle.

The rear handle locking mechanism will now be described. FIGS. 4 and 5 show the hub 32 having cut-outs 33 at different locations around its circumference. The cut-outs 33 cooperate with a locking lever 40 in the rear handle 20 so that it can be locked at predetermined angles relative to the housing. It is envisioned that the hub 32 have cut-outs at the 0°, 45° and 90° angles (in both directions), but it should be appreciated that any number of cut-outs at any angle could be chosen. Additionally, the hub could have no cut-outs at all and the rear handle could be completely "free-floating."

FIGS. 3-5 show the locking lever 40 secured inside the rear handle via a dowel pin 42 adjacent the hub 32. The locking lever pivots into and out of the cut-outs 33 to lock and unlock the rear handle 20. A sliding release button 44, having a body 45 and a shoulder 46, is located within an opening 43 of the rear handle. The shoulder 46 of the release button 44 has a cammed channel 47 (see FIG. 5) in which the locking lever 40 sits. As the release button 44 is pushed in either direction, the locking lever 40 rides along the cammed surface of the channel 47 to pivot out of the cut-out 33, thereby unlocking the rear handle 20. In this way, a user can push the release button from either side to unlock the rear handle, accommodating both right and left handed users. A spring 41 is connected to the locking lever 40 to bias the locking lever back into the locked position.

Figure 6:
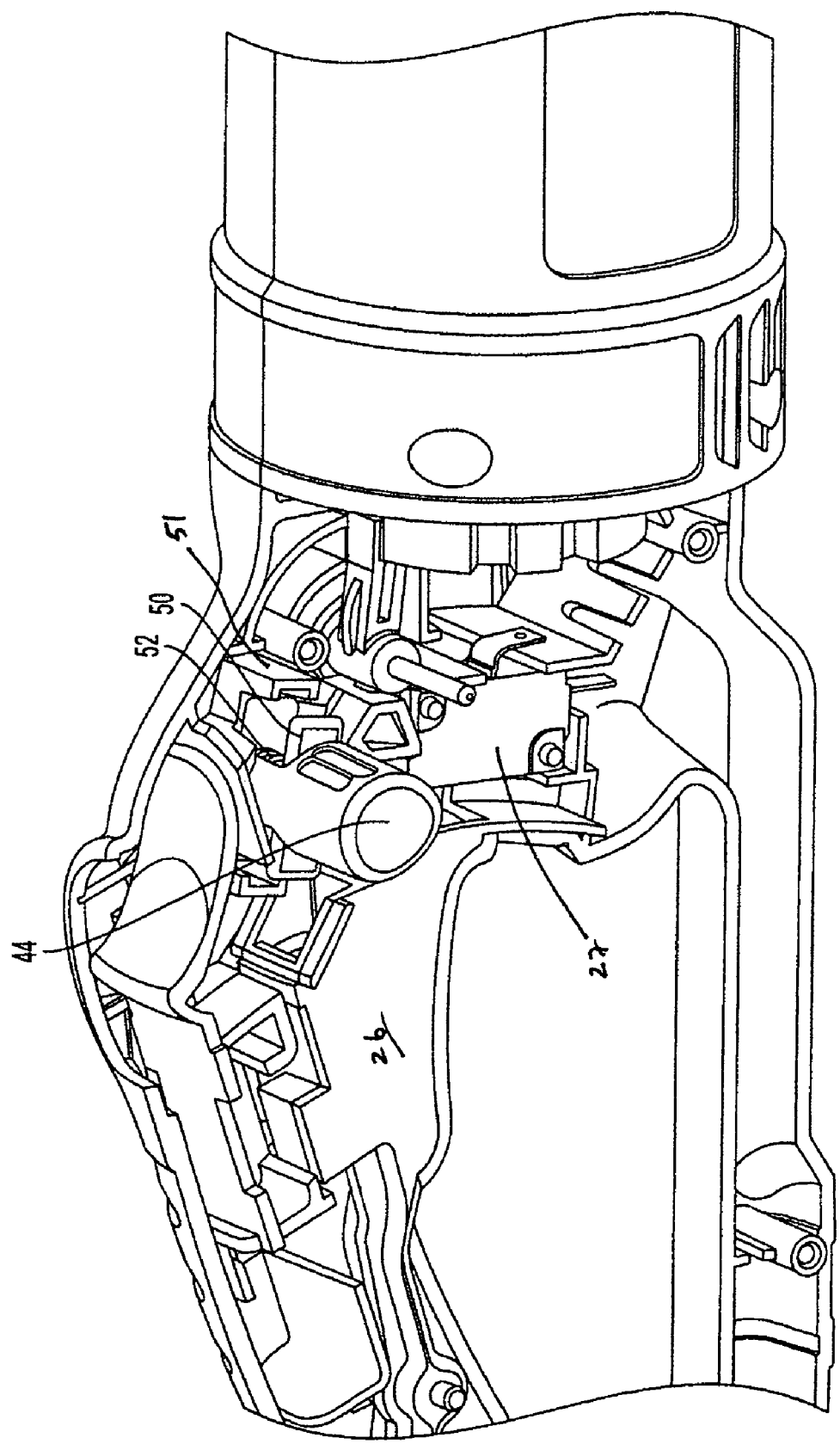
FIG. 6 is a top perspective view showing the interior of the rear handle

A slot 48 is formed in the body 45 of the release button 44. Two plates 50 are located in the slot with a spring 52 in between (see FIG. 6). The outer sides of the plates 50 are held by a bracket 51 (only one bracket is shown in FIG. 6). When the release button 44 is pushed from either side the bracket 51 holds the contacting plate 50 in place, while the other plate and the spring are compressed. When the release button is released, the spring 52 urges the plate and release button back to its neutral position. The user must keep the release button 44 depressed to rotate the rear handle 20. If the release button 44 is released, the springs 52 and 41 urge the locking lever 40 back into its locked position within one of the cut-outs 33.

The position of the locking mechanism adjacent the rear handle 22 and the trigger 26 allows the user to rotate the rear handle while maintaining his grip and keeping the trigger depressed. Furthermore, because the release button 44 can be accessed from either side of the power tool, this accommodates both right and left handed users.

While the disclosure has been described in the specification and illustrated in the drawings with reference to a particular embodiment, it will be understood by those skilled in the art that various changes may be made and equivalents may be substituted for elements thereof without departing from the scope of the disclosure as defined in the claims. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

The invention claimed is:

1. An outdoor power tool comprising:
a housing having a front end, a back end and a blade extending from the housing;
a motor located within the housing for driving the blade;
the housing having a hub;
a rear handle secured to the hub so as to be rotatable relative to the housing, the rear handle having a locking lever having a first position that engages the hub to secure the rear handle at a fixed position;
a release button having a cammed surface, the release button adapted to slide so that the cammed surface urges the locking lever into a second position wherein the locking lever does not engage the hub; and
wherein the release button has a shoulder with a channel and the cammed surface being located on both sides of the channel, and the locking lever located within the channel.

2. The outdoor power tool of claim 1, wherein the hub is spaced from the housing to create a groove therebetween and the rear handle is formed with a ring that is secured within the groove.

3. The outdoor power tool of claim 2, wherein the hub has a series of cutouts around its circumference and the locking lever pivots into and out of the cutouts.

4. The outdoor power tool of claim 3, further comprising a friction plate in the groove.

5. The outdoor power tool of claim 1, wherein the rear handle has a gripping member with a trigger thereon, the release button located adjacent the trigger so that a user can depress both the trigger and the release button with a single hand.

6. An outdoor power tool comprising:
a housing having a front end and a back end, an axis extending along the longitudinal length of the housing, and a blade extending from the front end of the housing;
a motor located within the housing for driving the blade;
the housing having a hub;
a rear handle secured to the hub so as to be rotatable about the axis, the rear handle having a locking lever having a first position that engages the hub to secure the rear handle at a fixed position; and
a release button extending through the rear handle, wherein the release button has opposing free ends, each free end being exposed on a respective one of opposing outer surfaces of said rear handle so that the release button can be actuated from either free end, the release button having a cammed surface and adapted to slide in a direction perpendicular to the axis so that the cammed surface urges the locking lever into a second position wherein the locking lever does not engage the hub.

7. The outdoor power tool of claim 6, wherein the hub is spaced from the housing to create a groove therebetween and the rear handle is formed with a ring that is secured within the groove.

8. The outdoor power tool of claim 7, wherein the hub has a series of cutouts around its circumference and the locking lever pivots into and out of the cutouts.

9. The outdoor power tool of claim 8, further comprising a friction plate in the groove.

10. The outdoor power tool of claim 6, wherein the release button has a a channel and the cammed surface being located on both sides of the channel, and the locking lever located within the channel.

11. The outdoor power tool of claim 6, wherein the rear handle has a gripping member with a trigger thereon, the release button located adjacent the trigger so that a user can depress both the trigger and the release button with a single hand.

12. An outdoor power tool comprising:
a housing having a front end and a back end, an axis extending along the longitudinal length of the housing, and a blade extending from the front end of the housing;
a motor located within the housing for driving the blade;
the housing having a hub;
a rear handle secured to the hub so as to be rotatable about the axis, the rear handle having a release button and a locking lever for locking said rear handle to said hub, the release button having opposing free ends, each free end being exposed on a respective one of opposing outer surfaces of said rear handle so that the release button can be actuated from either free end to slide perpendicular to the axis to move the locking lever into an unlocked position; and
a spring urging said release button into a neutral position, wherein the locking lever is in a locked position.

13. The outdoor power tool of claim 12, wherein the release button has a shoulder with a channel, cammed surfaces being located on both sides of the channel, and the locking lever located within the channel.

* * * * *